A. & A. N. WOLF,

Assignors, by mesne assignments, to THEMSELVES, and D. L. HAMAKER.

Machine for Separating Middlings.

No. 9,170. Reissued April 20, 1880.

WITNESSES

Mary A. Utley

Frank J. Masi.

INVENTORS

Augustus Wolf

A. N. Wolf by E. W. Anderson their ATTORNEY

N. PETERS, PHOTO-LITHOGRAPHER, WASHINGTON, D. C.

UNITED STATES PATENT OFFICE.

AUGUSTUS WOLF AND ABRAHAM N. WOLF, OF ALLENTOWN, ASSIGNORS, BY MESNE ASSIGNMENTS, TO THEMSELVES AND DAVID L. HAMAKER, OF EAST HEMPFIELD TOWNSHIP, PENNSYLVANIA.

MACHINE FOR SEPARATING MIDDLINGS.

SPECIFICATION forming part of Reissued Letters Patent No. 9,170, dated April 20, 1880.

Original No. 214,073, dated April 8, 1879. Application for reissue filed March 6, 1880.

*To all whom it may concern:*

Be it known that we, AUGUSTUS WOLF and ABRAHAM N. WOLF, of Allentown, in the county of Lehigh and State of Pennsylvania, have invented certain new and useful Improvements in Machines for Separating Middlings; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to that class of machines for separating middlings from the bran on the one hand and fine flour on the other in which suction or blast is employed by means of a fan or blower; and the novelty consists in the combination, with the sieves, concave receivers, and their reciprocating frames, of elbow-levers connecting said frames, cord-holding cross-pieces, cords, and adjustable cord-rollers, said cords and cross-pieces being within said frames and receiving from them a reciprocating motion, whereby the whipping of the cords is designed to keep the cloths of the screens clean, all as hereinafter shown and described.

Figure 1:
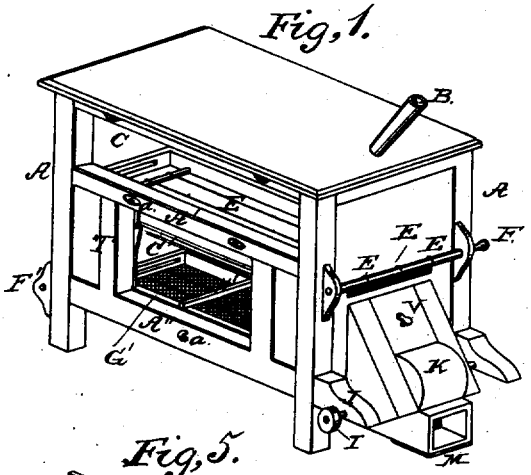
Figure 2:
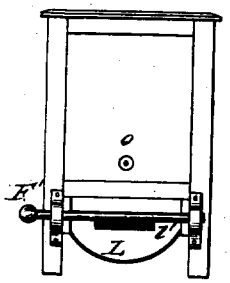
Figure 5:
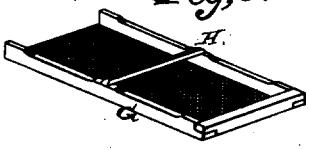
Figure 3:
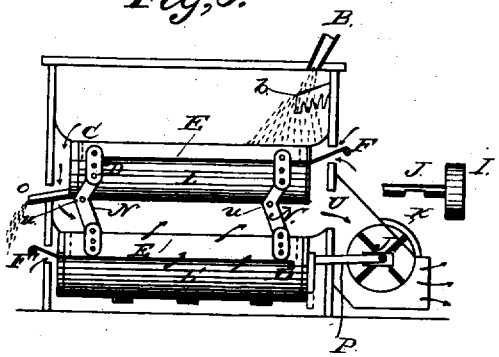
Figure 4:
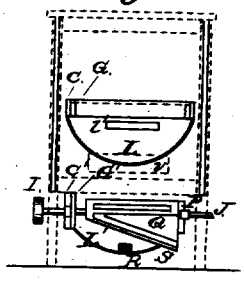

In the accompanying drawings, Figure 1 represents a perspective view of the machine with the two side doors removed and the upper sieve lifted out to show the interior arrangement. Fig. 2 shows the exterior of the rear end of the machine. Fig. 3 represents a side view with the side of the frame removed. Fig. 4 is a front view with the fan removed to show the discharge-openings, and Fig. 5 a perspective view of the upper sieve removed.

Short uprights T are arranged on each side between the horizontal framing-bars A′ A″, and serve for pivot-fastenings, on which the central portions of elbow-levers N N bear, said levers serving to communicate a reciprocating or shaking motion to two sieve boxes or frames, C C′. These frames are connected to the ends of said elbow-levers by pins at two points on each side, respectively. The lower frame, C′, is connected by a rigid pitman, P, with an eccentric or crank attachment made in the shaft J of the fan incased at K, and driven by any gear or power connecting with the strap-pulley I. These coupled frames have air-spaces and room for vibration between their ends and the ends of the case which incloses them, and are jointly supported parallel with each other on the pivoted lever-arms N. These frames are provided with end pieces having rounded lower edges and with sheet-metal concave receivers L L′, each having a cross-section of nearly half a circle attached to said frames and end pieces. Within each frame there is also a cross-piece or cord-holder, D, extending from one side to the other at one end, to which three or more cords, E, are affixed and carried through slots to the outside of the case or box, and connected to rollers F F′, which serve for tightening the cords, and have pawl-and-ratchet devices to hold them in the adjustment made. These rollers are placed at opposite ends of the case, as shown, and tend to elevate the closed ends of the sieves G G′. Each sieve has a raised rim along its two sides and across the rear end, the other end being open.

The cross-piece joining the two sides is beneath the bolting-cloth, and the coarser matter on the upper sieve will be unobstructed in its passage to and through a slot in the outer frame, C, whence it falls upon the lower sieve, G′, which is similarly constructed.

Each sieve has a bridge-piece, H H′, transversely connecting the upper edges of the sides of each sieve-frame to strengthen it, sufficient space being left below for the matter to pass under it freely.

The finer flour sifted through the upper and finer meshes of the bolting-cloth drops down into the receiver L and is discharged through a tube at O into a suitable receptacle or conveyer on the outside. The material now passes over the lower sieve, G′, which separates the middlings from the bran. These middlings are discharged from the receiver L′ through a central end opening, R, while the tailings pass from the open end of the sieve into an oblique spout, Q, and are discharged on one side at S.

Adjusting-valves W may be made in the receiver L′.

The ground wheat is fed in through the top of the box A at one end by an ordinary tube or hopper, B, and falls upon a deflector, *b*, on the inside, whereby it is distributed over the front part of the sieve G. The fan-case K has an adjusting-valve, V, and the air is discharged at M, finding ingress chiefly through the end opening in the receiver L′, and circulating under, through, and over the sieves.

The suction-blast may be made to act in the direction indicated by the arrows in the drawings, and, together with the whipping cords or cleaners E, is so readily adjusted as to cause the material on the sieves to bounce up more or less forcibly.

The open end of each sieve rests only on the cross-piece D, and its other end is more or less elevated by the tension of the cords, which are arranged on the top of said cross-piece, so that the cords are in close contact with the cloth on the frame of the sieve, which is otherwise disconnected from the outer reciprocating frame, in which it rests and receives its shaking motion.

Having described this invention, what we claim, and desire to secure by Letters Patent, is—

In a machine for separating middlings, the combination, with the concave receivers L L′, the sieves, and their reciprocating frames, of the elbow-levers N N, cord-holding cross-pieces D D, cords E, and adjustable cord-rollers F F′, said cords and cross-pieces being within said frames and receiving therefrom a reciprocating motion, whereby the whipping of the cords will keep the sieve-cloths clean, substantially as specified.

In testimony that we claim the foregoing we have hereunto set our hands this 22d day of January, 1880.

AUGUSTUS WOLF.
A. N. WOLF.

Witnesses:
F. B. EBERHARDT,
HENRY F. KLECKNER.